US010715443B2

(12) United States Patent
Kumar T C et al.

(10) Patent No.: US 10,715,443 B2
(45) Date of Patent: Jul. 14, 2020

(54) EFFECTIVE HANDLING OF WCCP REJECT TRAFFIC

(71) Applicant: Cisco Technology, Inc., San Jose, CA (US)

(72) Inventors: Ashwin Kumar T C, Bangalore (IN); Rahul Gupta, Bangalore (IN); Rajesh Mullangath Sakthidharan, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 49 days.

(21) Appl. No.: 15/794,290

(22) Filed: Oct. 26, 2017

(65) Prior Publication Data
US 2019/0132246 A1 May 2, 2019

(51) Int. Cl.
H04L 12/801 (2013.01)
H04L 29/08 (2006.01)
H04L 12/853 (2013.01)

(52) U.S. Cl.
CPC .......... H04L 47/12 (2013.01); H04L 47/2416 (2013.01); H04L 67/2842 (2013.01); H04L 67/32 (2013.01)

(58) Field of Classification Search
CPC .. H04L 47/12; H04L 47/2416; H04L 67/2842
See application file for complete search history.

(56) References Cited

U.S. PATENT DOCUMENTS

| 6,687,732 | B1* | 2/2004 | Bector | H04L 29/12009 709/200 |
| 2008/0120433 | A1* | 5/2008 | Cieslak | H04L 67/2814 709/238 |
| 2012/0093156 | A1* | 4/2012 | Budhani | H04L 67/2814 370/392 |

* cited by examiner

Primary Examiner — Jackie Zuniga Abad
(74) Attorney, Agent, or Firm — Polsinelli PC

(57) ABSTRACT

Systems, methods, and computer readable storage mediums are disclosed for the management of rejected traffic in a WCCP protocol. A request is received from a switch to redirect traffic from a client device to a cache engine. The cache engine determines that it cannot process traffic from the client device, and in response to the determination, sends a command to the switch to suspend traffic to the cache engine. The command includes instructions for one or more of removing a particular rule regarding routing of the traffic to the cache engine or modifying an access control list rule to exclude the cache engine.

20 Claims, 6 Drawing Sheets

EFFECTIVE HANDLING OF WCCP REJECT TRAFFIC

TECHNICAL FIELD

The present disclosure relates generally to WCCP traffic, and more specifically to WCCP traffic handling.

BACKGROUND

The Web Cache Communication protocol (WCCP) is a content-routing protocol that provides a mechanism to redirect traffic flows in real-time. It allows utilization of engines or other caches running WCCP to localize web traffic patterns in the network, enabling content requests to be fulfilled locally. Traffic localization reduces transmission costs and download time.

WCCP works by placing a WCCP capable router/switch in between users and the internet, either in the path or as the default gateway. The WCCP device will then transparently redirect traffic on the ports that are configured over to a Web Gateway for filtering and proxying. The user has no idea that the Web Gateway is in place as all traffic is sent from the Web Gateway directly back to the user while spoofing the server's IP address.

In practice, when a client device requests a webpage, instead of going outside the local area network (LAN) to the internet, the request is sent to a router/switch which redirects the traffic to a cache engine (CE). The CE includes a database or cache of previously accessed webpages. It caches all or a portion of the most recently accessed webpages and handles requests from the switch/engine. Accordingly, if the webpage the client device is requesting is included within the cache, the webpage is fetched from the cache instead of the internet. If the webpage is not included within the cache, the request goes back to the router/switch and then on to the internet, where the webpage is saved on the cache for subsequent use. This allows bandwidth to be used judiciously.

However, traffic redirection to the CE can be rejected for reasons beyond that the website has not been accessed before. The CE might be temporarily overloaded, cannot handle the types of packets included in the traffic, is in maintenance, etc. No matter the reason, though, the traffic takes the same path as if it is initially accessing the website. This causes unnecessary processing on a continuous basis, as the router/switch keeps sending packets to be rejected by the CE, using expensive resources (such as TCAM lookups) until the traffic is either manually redirected to the internet or the processing issue is finally resolved.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Figure 1:
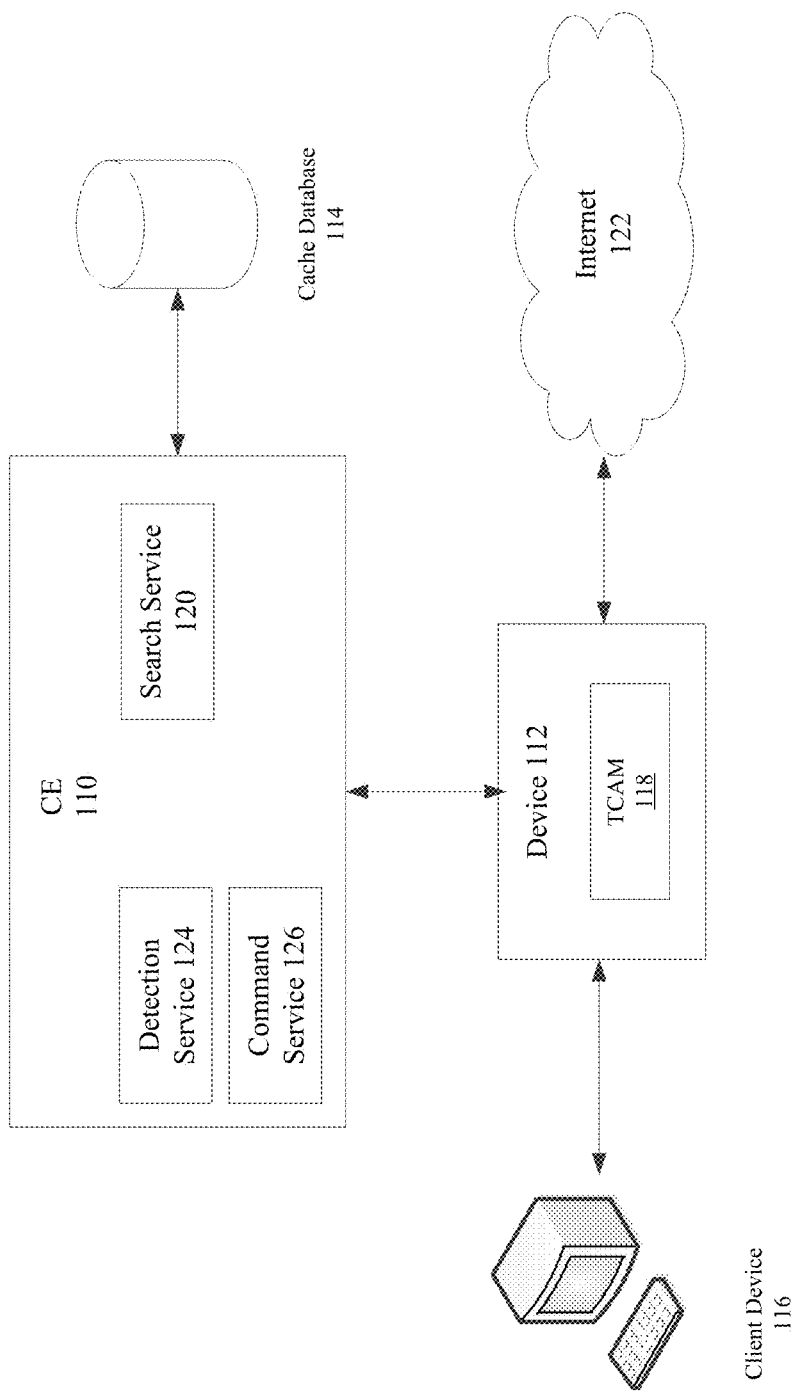
FIG. 1 illustrates an example embodiment of a cache engine based approach to handling rejected WCCP traffic.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

Systems, methods, and computer readable storage mediums are disclosed for the management of rejected traffic in a WCCP protocol. A request is received from a switch to redirect traffic from a client device to a cache engine. The cache engine determines that it cannot process traffic from the client device, and in response to the determination, sends a command to the switch to suspend traffic to the cache engine. The command includes instructions for one or more of removing a particular rule regarding routing of the traffic to the cache engine or modifying an access control list rule to exclude the cache engine.

Example Embodiments:

There is a need for a CE or router/switch driven process to effectively handle rejected packets in order to optimize router/switch and CE resources (e.g., such as power, processing, timing, and hardware component resources). The disclosed technology addresses the need in the art for handling rejected packets sent from a switch to a CE in a WCCP traffic protocol. (While "switch" is used throughout the specification, the invention may easily substitute the switch with a router). Traffic from a switch can be rejected by the CE for more reasons than just that the webpage has not been previously accessed and saved on the cache. These types of packet rejections, however, are problematic because in modern solutions, the rejected traffic takes the same path as if it were initially accessing the website (e.g., is directed back to the switch after being rejected by the CE, which then directs it to the internet) regardless of the reason for rejection.

But there are a number of problems associated with continuously processing requests for packets that are certain to be rejected by the CE. Packet redirection in the WCCP protocol, while it is less expensive than always accessing the internet, is still normally an expensive process due to resources devoted to router/switch and CE resources (e.g., resources devoted to power, processing, timing, and hardware components). For example, regardless of the reason for being rejected, the packets will continue to travel from the switch to the CE and then come back to the switch for usual forwarding until there is manual correction or the processing issue with the CE is resolved. Moreover, in the case of GRE Tunneling, the packet path may involve multiple hops, where encapsulation and decapsulation of the packet occurs at both ends of the tunnel. And since packets are redirected to the CE from rules configured on the switch's TCAM, packets that are certain to be rejected uselessly occupy TCAM entries, thus preventing utilization of valuable hardware resources.

In some cases, upon detecting rejected traffic, the CE may internally communicate with another designated CE to reroute the traffic. This process internally reconfigures various rules across the CEs and their respective switches. However, this approach increases bandwidth requirements of the other CEs and, furthermore, the traffic is redirected at least a second time to the other CE. In cases where these kinds of rejections are temporary, CE reconfiguration would require reconfiguration of the CEs back to original configurations once the initial CE becomes available again. And when there are no cache engines who can handle the traffic, the rejected traffic would still have to go through the usual forwarding process. As a result, CE reconfigurations would continue to consume more processing time, processing power, and hardware resources (e.g., TCAM resources) than is necessary.

Accordingly, the invention disclosed herein employs a CE driven solution between the CE and its associated router/switch. The CE self-diagnoses an inability to accept packets from the switch, determines a solution, and then sends a command to the switch. The switch, after listening for and receiving the command, acts accordingly. In some embodiments, for example, the solution may be a new extension to the WCCP protocol agreed to by both the CE and the switch.

The solution can be either command based or timer based. Command based solutions include commands from the CE to the switch to suspend traffic redirection to the CE and then (either in the same command or a separate command) resume the previous redirection. In contrast, timer based solutions involve the switch suspending redirection of traffic to the CE and starting a timer. After the timer expires, the switch resumes redirection of traffic to the CE.

These approaches have numerous advantages. It would allow the problematic CE to independently detect temporary glitches, which reduces rejected traffic to the CE and switch interface. The solution is also local between the problematic CE and the switch, and would not involve other CEs or the designated CE in a service group. As these instructions are added as an extension, they would not impact or interfere with regular protocols (and there would be no impact to switches or routers not supporting these extensions). It provides a way to handle unnecessary flow rejects at the CE, enabling effective hardware resource usage both at the CE and the router/switch and also enables effective timing and power utilization (e.g., reduces the number of hops, the number of redirections, encapsulation and decapsulation, etc.).

Thus, methods and systems for effectively managing rejected traffic in a WCCP protocol involve a CE receiving a request from a switch to direct traffic from a client device to the CE. In response to determining that the CE cannot process the traffic from the client device, a command is sent by the CE to the switch to suspend traffic to the CE. The command includes instructions for removing a particular rule regarding routing of the traffic to the cache engine, modifying an access control list rule to exclude the cache engine, or both.

FIG. 1 illustrates an example embodiment of a CE based approach to handling rejected WCCP traffic. Cache Engine (CE 110) runs a Web Cache Communication (WCCP) protocol to communicate with a router/switch (device 112) and cache server content (e.g., cache database 114) for faster WAN access. Device 112 is a switch or router that runs the WCCP protocol connected to CE 110 and client device 116. Client device 116 can be one or more hosts or other devices who are trying to access a server (such as a webserver that the host is trying to access data from) via device 112.

A system for managing traffic in a WCCP protocol, including traffic rejected by CE 110, includes client device 116, device 112 (switch/router), and CE 110. Device 112 is in communication with both client device 116 and CE 110, and determines whether to forward traffic to internet 122 or redirect traffic to CE 110 for cache lookup. The process begins with client device 116 sending a request for a webpage to device 112. TCAM 118 on device 112 receives the request, which can include an http request, IP address, or protocol request, and then performs a lookup based on the request to determine which CE to redirect the traffic. In the embodiment shown, device 112 redirects the request to CE 110, which can take traffic from any number of switches (or routers). CE 110 receives the request from device 112, where search service 120 searches cache database 114 to determine if the webpage is stored within the cache.

If the webpage is stored in cache database 114, CE 110 sends the webpage content back to device 112, which then sends the webpage content to client device 116. In this way, traffic from client device 116 never leaves the local network.

Conversely, if search service 120 determines that the webpage is not stored in cache database 114 (such as a requested webpage that hasn't been viewed yet), CE 110 sends the request back to device 112, which then forwards the request to internet 122. The webpage content is then redirected from device 112 to CE 110, where the content is stored on cache database 114, and then directed back to device 112 for delivery to client device 116. Subsequent requests to access the webpage are then redirected by device 112 to CE 110 for lookup in cache database 114.

CE 110 can communicate with device 110 and/or cache database 114 by exchanging one or more of these types of data packets including, but not limited to, cache fill requests, cached responses to the client, and packet rejections. In cache fill requests, the packet is sent from CE 110 to cache database 114 (which can be, for example, a server local or remote to CE 110) to fetch the data for caching. This applies when device 112 is the gateway for CE 110. In a cached response to the client, CE 110 returns the cached content to device 112. Device 112 will then forward the cached content to the host that originally requested it (e.g., client device 116).

By contrast, in a packet reject, CE 110 rejects the packet as is to device 112 when CE 110 is not able to service the request. Packet rejects are error cases, which can occur for a variety of reasons. For example, CE 110 can become overloaded with traffic and, as a result, cannot handle further requests. CE 110 can temporarily be unable to handle traffic flows for other numerous reasons (or combination of reasons), and could resume servicing traffic flow from device 112 after some time duration. Or the particular CE could be servicing multiple routers and/or switches, and the other routers and/or switches have higher priority traffic requirements than device 112 or client device 116. These reject cases and others will be discussed in more detail further on.

Detection service 124 determines that CE 110 cannot process the traffic from client device 116 by detecting glitches in processing requests. If glitches are detected, command service 126 determines a solution that device 112 can implement, and sends that solution as a command to device 112. For example, the solution can be a command sent to device 112 to suspend the traffic from client device 116 to CE 110. The command can take any number of forms, such as instructions for removing a particular rule regarding routing of the traffic to CE 110 or modifying an access control list rule to exclude CE 110.

Device 112 receives the command from CE 110 or command service 126, and then acts accordingly (such as removing or modifying routing rules stored on TCAM 118). For example, if command service 126 determines that CE 110 is overloaded with traffic from other switches or routers, the command can direct device 112 to remove CE 110 from its associated routing entry on TCAM 118. As a result, traffic from client device 116 skips redirection to CE 110 and is automatically forwarded to internet 122.

Figure 2:
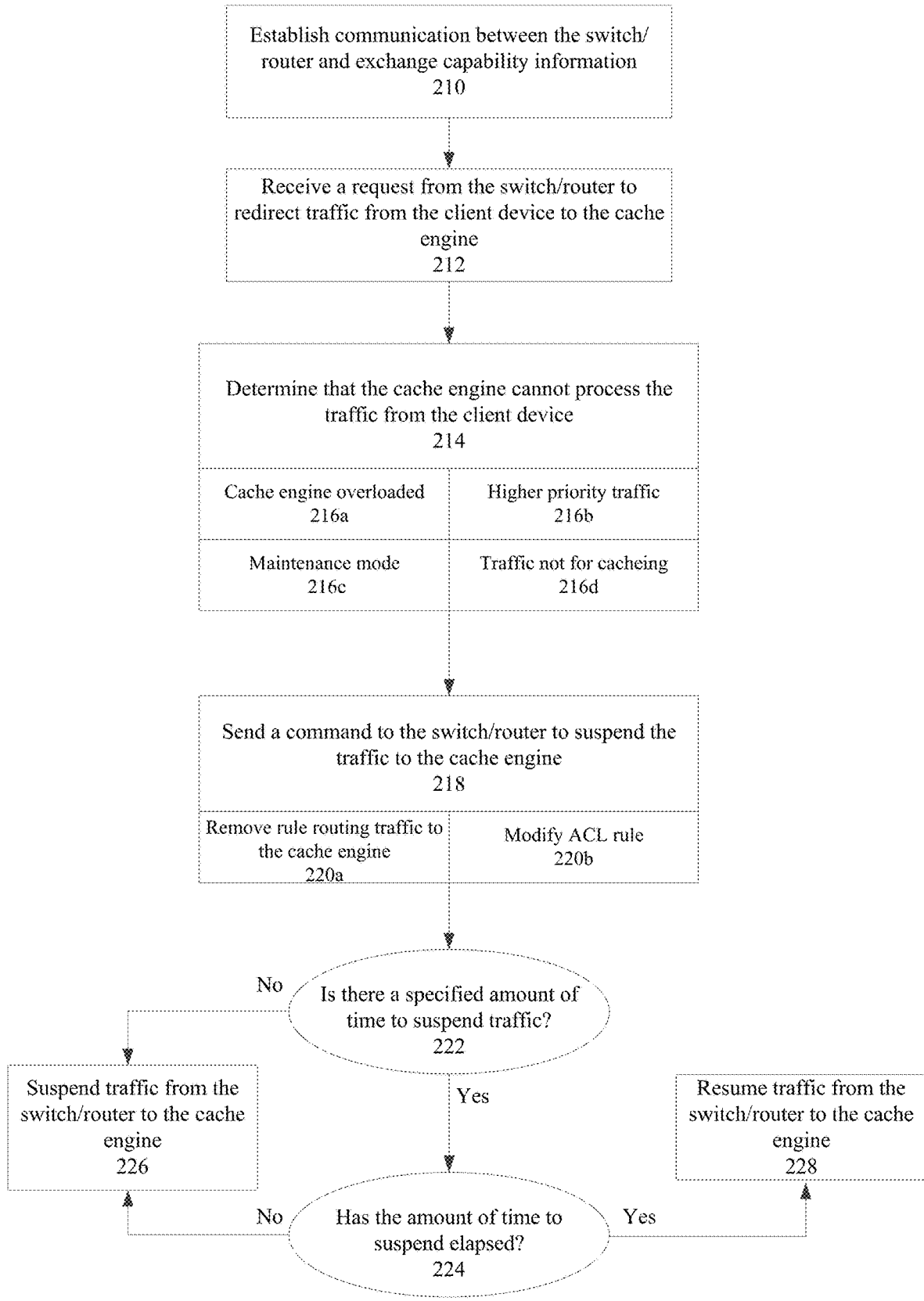
FIG. 2 is a flow chart illustrating a method of handling rejected WCCP traffic.

FIG. 2 shows a flow chart illustrating a method of handling rejected WCCP traffic. The process begins when client device 116 sends a request to device 112 to access a webpage. Communication is established between device 112 and CE 110 once device 112 receives the request, and thereafter capability information is exchanged between device 112 and CE 110 (step 210).

Device 112 forwards the request from client device 116 to CE 110 in order to redirect the traffic from client device 116 from internet 122 to CE 110 instead (step 212). Appropriate information can be exchanged between device 112 and CE 110 with the request, including actions and protocols supported by CE 110, device 112, or both. For example, CE 110 and/or device 112 may ask the other if suspension or limitation of certain types of traffic is a recognized command.

For example, CE 110 and device 112 can tell each other that commands related to suspension or limitation of traffic can be recognized and implemented by agreeing on a new extension to the WCCP protocol. The new extension to the WCCP protocol can be related to suspending, stopping, or limiting certain traffic from device 112 when CE 110 determines such action is needed. The new extension may or may not specify a time period. For example, the new extension can be "//STOP temporary re-direction//", which tells device 112 to temporarily stop redirecting traffic to CE 110.

The capability to support this protocol or solution can be sent during one or more protocol handshakes during device negotiation. During the protocol handshake, a "Here I Am" message and an "I See You" response can be exchanged one or more times between device 112 and CE 110. Either device can send either the message or response in any order, and can do so on a periodical or continuously periodical basis.

A 'Here I Am' message contains at least one of a Capability Information Component (e.g., a control message to understand if the router/switch supports certain protocols/solutions) and/or a Command Extension Component (e.g., the ability to modify, delete, or otherwise change which protocols/solutions are currently implemented), along with the following components: WCCP Message Header, Security Information Component, Service Information Component, Web-Cache Identity Information Component, Web-Cache View Information Component, and Address Table Component. An 'I See You' response contains at least one of a Capability Information Component and/or a Command Extension Component, along with the following components: WCCP Message Header, Security Information Component, Service Information Component, Router Identity Information Component, Router View Information Component, Assignment Map Component or Alternate Assignment Map Component, and Address Table Component. If both CE 110 and device 112 agree on the support for protocols/solutions during a protocol handshake, then it is known that device 112 can support the redirection suspension and resume functionality (either temporarily or indefinitely).

For example, CE 110 and device 112 can negotiate if both devices support suspension of traffic redirection from device 112 by exchanging a WCCP2_SUSPEND_ RESUME_REDIRECTION type in the Capability Information Component (where the Capability Information Component defines the suspend and/or resume type as WCCP2_ SUSPEND_RESUME_REDIRECTION, along with other defined types such as: WCCP2_FORWARDING_METHOD, WCCP2_ASSIGNMENT_METHOD, WCCP2_PACKET_RETURN_METHOD, WCCP2_TRANSMIT_T, and WCCP2_TIMER_SCALE). Any routers, switches, and/or web-caches ignore any Capability Element that have an unrecognized type during protocol handshakes. Thus, if the suspend and/or resume type is recognized, it is determined that the router or switch supports the suspend/resume redirection feature (which is determined when the negotiation is complete). CE 110 can then instruct device 112 to suspend and/or resume redirection via the extension proposed as part of the new Command Element Type in Command Extension Component.

After negotiation is complete, however, CE 110 may determine that it cannot process traffic redirected from client device 116 (step 214). For example, CE 110 can detect a choke or reject for a particular flow or all flows and can communicate the same to device 112. For example, if both CE 110 and device 112 agreed on the support for the new WCCP2_SUSPEND_RESUME_REDIRECTION command/protocol, then when CE 110 detects a reject (temporary or flow based), then it will communicate the same via the Command Extension Component to device 112.

CE 110 may determine that it cannot process traffic when it detects rejected packets. For example, CE 110 can locally detect temporary glitches in processing device 112 requests. Temporary glitches at CE 110 may be caused by a number of reasons.

For example, CE 110 can determine that it cannot process traffic from device 112 based on CE 110 being overloaded with requests from other switches or routers (step 216a). CE 110 can be overloaded and is accordingly unable to handle any further requests for a period of time. In some cases, CE 110 may determine that traffic has increased beyond its capacity and must monitor traffic levels until it has decreased to a manageable level. In other cases, CE 110 may expect traffic to increase beyond its capacity at a certain time for a certain period. For example, traffic levels may increase between 7-10 am Monday-Friday as users browse webpages and check email. In that case, CE 110 can determine that it cannot support traffic from device 112 during that span of time, but may easily support traffic outside those hours. In other embodiments, CE 110 can determine an inability to support traffic from device 112 based on requests from other switches or routers having higher priority traffic requirements than the traffic from the client device (step 216b). Or the determination may be based on CE 110 being in a maintenance mode for a period of time (e.g., CE 110 is scheduled to be down for maintenance at 2:30 pm on Friday or has a recurring maintenance/checkup mode for the last Friday of every month at 7 pm) (step 216c).

In some embodiments, the traffic from device 112 may not be appropriate for caching (step 216d). For example, it makes no sense to cache traffic that is associated with live content, such as live match scores (e.g., the latest football scores). In those cases, CE 110 can determine that those types of traffic need to be infinitely suspended from redirection to any CE, since any CE should never handle that type of content.

In other embodiments, CE 110 may not able to handle traffic from a particular flow due to its internal filtering for certain types of packets. This could happen if IP Authentication is enabled, there are permanent failures for certain types of traffic, and/or there are internal CE SW failures, like database issues, etc. In addition, the targeted application (Port, IP address, etc.,) may not be supported by CE 110.

Whatever the reason, CE 110 then communicates to device 112 its status associated with the choke or reject in response to its local determination that it cannot handle device 112's traffic. The status may be specific to a choke or reject for traffic from the particular client device (e.g., client device 116), the particular router or switch (e.g., device 112), or all traffic from all other devices.

In addition to CE 110's status, CE 110 can also send an action for device 112 to take. For example, CE 110 can send a command to device 112 to suspend redirection of its traffic to CE 110 (step 218). The command can remove one or more rules routing traffic to CE 110 (step 220*a*) or modify an ACL rule (step 220*b*). The command can be applied to all routers or switches in communication with CE 110, can be applied to routers or switches on an individual basis (e.g., just device 112), and can be limited to a particular type of traffic from client device 116.

In some embodiments, CE 110 sends a specified amount of time to suspend traffic (step 222). In that case, if the amount of time has not passed or elapsed (step 224), then redirected traffic from device 112 to CE 110 is suspended (step 226). However, when the amount of time elapses/passes, then redirected traffic from device 112 to CE 110 is resumed (step 228). For embodiments where CE 110 doesn't specify an amount of time, traffic from device 112 to CE 110 is suspended indefinitely (either until CE 110 sends a resume traffic command, device 112 determines that traffic should be resumed based on heuristics of past CE 110 behavior patterns, or traffic is meant to be suspended for all time) (step 226).

The command to device 112 to suspend traffic to CE 110 can be, for example, a new extension to the WCCP protocol, such as a new Command Extension Component with command element types defined as:

---
WCCP2_COMMAND_TYPE_SUSPEND_REDIRECTION,
WCCP2_COMMAND_TYPE_SUSPEND_REDIRECTION_RESP,
WCCP2_COMMAND_TYPE_RESUME_REDIRECTION, and/or
WCCP2_COMMAND_TYPE_RESUME_REDIRECTION_RESP.
Other command element types can be, but are not limited to,
WCCP2_COMMAND_TYPE_SHUTDOWN and
WCCP2_COMMAND_TYPE_SHUTDOWN_RESPONSE.

---

Associated command data (which can be in TLV format) can carry the following information: traffic type flag, data for each traffic type (Port List/IP Address List/Protocol List etc.,), and a time period for suspension. For example, the traffic type flag can be a bit mask that indicates the types of traffic that the suspension or redirection is applied to. The traffic types within the traffic type flag can be, but are not limited to, traffic or flow related to all traffic, port, protocol, IP address (e.g., some set of IP addresses), and unknown (e.g., unidentified traffic type). Data for each traffic type can contain one or more of a port list, IP address list, protocol type list, etc. Each traffic type can have an associated time period field. This field will be applicable for the SUSPEND redirected traffic case and will indicate how long the redirect should be suspended. The time period for suspension can be a fixed time period (e.g., 3 seconds), 0 (which implies suspension until further notice), or an unknown time (wait for a resume command—which is especially useful for when CE 110 is temporarily overloaded with traffic).

In some embodiments, the unknown traffic type can indicate to device 112 that CE 110 will not/cannot determine what kind of flow is being rejected. It is for device 112 to run its own heuristics to determine the flow being rejected and accordingly take further action, based on the time period suggested by CE 110 or device 112's own internal algorithm if nothing is specified. This can be especially useful for embodiments where the router or switch runs its own heuristics and then suspends and/or resumes the flow with minimal CE 110 support.

Thus, in some embodiments, if CE 110 and device 112 agree that they support the capability WCCP2_SUSPEND_RESUME_REDIRECTION after negotiation, CE 110 will detect or determine if it cannot handle certain traffic types due to the various reasons mentioned above. Command service 126 will then instruct device 112 to suspend all traffic or a certain type of traffic for re-direction by sending the command WCCP2_COMMAND_TYPE_SUSPEND_REDIRECTION. If device 112 is able to handle the command, it will acknowledge the command by sending a response to CE 110 (e.g., WCCP2_COMMAND_TYPE_SUSPEND_REDIRECTION_RESP). Upon receipt of the suspend command, device 112 can interpret the received command and identify the rules previously programmed for the traffic in TCAM 118 based on the Port/Protocol/IP address for WCCP. Device 112 can then remove and/or update TCAM 118 entries (and/or ACL) to ensure that there is no redirection for the traffic/traffic type to CE 110. Additionally and/or alternatively, if this is a temporary suspension, then device 112 starts a timer and, upon expiry of the timer, ensures that TCAM 118 and/or ACL is updated to resume traffic redirection to CE 110.

There are a couple ways to resume redirection from device 112 to CE 110 (step 228), including a command based approach and a timer based approach. For the command based embodiments, CE 110 will send a specific command to device 112 to resume the redirection, while in the timer based embodiments, device 112 itself resumes traffic redirection when the period of time for suspension elapses. Along with the command to suspend, CE 110 can communicate how it wants device 112 to resume the suspended redirection.

For command based embodiments, CE 110 can send a resume command to device 112 to resume traffic redirection to CE 110. This can e=be sent by CE 110 after a period of time has elapsed. Once device 112 receives this command via the WCCP protocol, it can remove entries in TCAM 118 or update the ACL rules to temporarily suspend the flow of redirected traffic to the particular CE. Or, in other words, previous TCAM 118 entries can either be removed or rules added above the previous rules to override the previous redirection path. This saves time, power, and/or hardware resources.

For timer based embodiments, the suspend command from CE 110 to device 112 specifies a period of time to suspend the traffic. Device 112 resumes traffic to CE 110 when the period of time has elapsed, which can be done via a timer on device 112. In these embodiments, device 112 starts a timer and resumes redirection after the timer expires (e.g., CE 110 specifies that traffic is to be resumed in 3 seconds. Device 112 sets up a timer for 3 seconds and, after 3 seconds have passed, automatically resumes redirection to CE 110).

Traffic from device 112 to CE 110 can be resumed by re-applying the particular rule regarding routing of traffic to CE 110. Once device 112 receives a resume request, for example, device 112 re-applies the rules to resume original redirection to CE 110. Thus, continuing with the example, upon receipt of WCCP2_COMMAND_TYPE_ RESUME_REDIRECTION, device 112 responds back to CE 110 with WCCP2_COMMAND_TYPE_RESUME_ REDIRECTION_RESP. Then device 112 resumes the previously suspended redirection towards CE 110 by stopping any timers running and reprogramming the ACL/TCAM 118 based on the rules previously programmed for the traffic based on the Port/Protocol/IP for WCCP.

Figure 3:
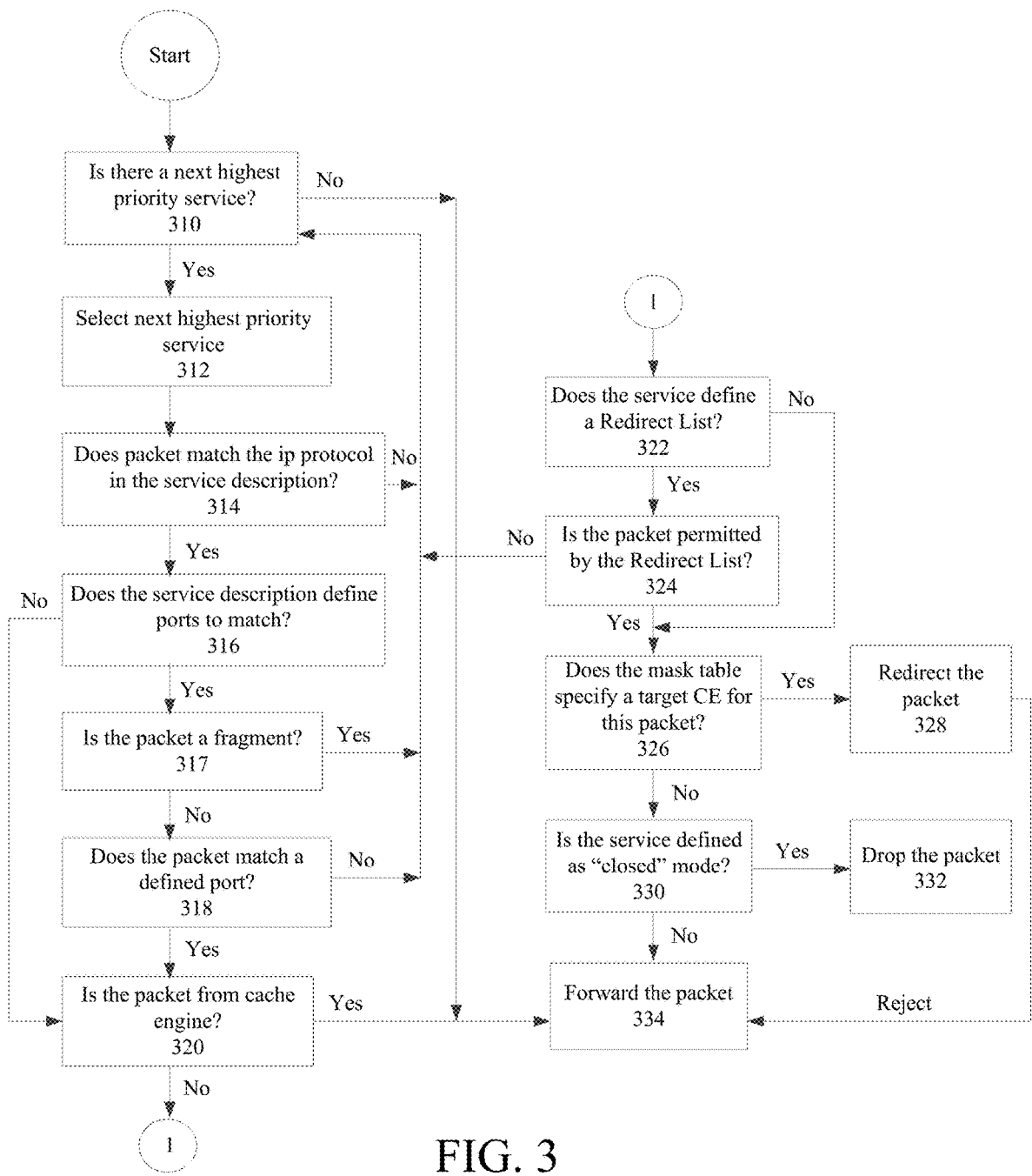
FIG. 3 is a flow chart illustrating an example embodiment of traffic flow in a cache engine based approach to handling rejected WCCP traffic.

FIG. 3 shows a flow chart illustrating an example embodiment of traffic flow in a CE based approach to handling rejected WCCP traffic. A typical method that is run on a router or switch to determine if a packet needs to be forwarded to a CE or not is as follows.

For the simplest case, device 112 may be configured to only forward traffic to internet 122 (e.g., WCCP is not supported). In this case, the method can determine that there is not a next highest priority service for an incoming packet (e.g., such as traffic redirection to CE 110) (step 310). If so, device 112 forwards the packet (step 334).

If device 112 supports WCCP, however, there is at least one higher priority service and the next highest priority service is selected (step 312). Device 112 then determines whether the packet matches an IP protocol in the service description (step 314). If it doesn't, the method returns to step 310 to forward the packet. If it does match the IP protocol, device 112 determines if the service description defines ports to match the IP protocol (step 316). If it doesn't, device 112 determines if the packet is from CE 110 (step 320) and, if so, forwards the packet (step 334). If ports are defined, however, device 112 proceeds to determine if the packet is a fragment (step 317) and if the packet matches a defined port (step 318). If the packet is not a fragment and matches the defined port, the method determines if the packet is from CE 110 (step 320). If not, device 112 returns to step 310 and forwards the packet to internet 122 (step 334). If the packet is from CE 110 though, the packet is forwarded (step 334).

If the packet is not from CE 110, however, the method continues to determine whether the packet needs to be redirected, dropped, or forwarded to the internet.

In some embodiments, CE 110 only takes packets authorized to be sent. Thus, device 112 determines if the service is defined in a redirect list (step 332), which defines whether the packet may be redirected to CE 110. If so, the method continues when the packet is permitted and/or authorized by the redirect list (step 324). If not, device 112 forwards the packet to internet 122 (step 334).

In WCCP, there can be at least two types of services including, but not limited to, a "well known" service and "dynamic" service. In the well known service, the router and the CE know about the type of traffic to be redirected. This type of service is mainly used for web-cache service on fixed port of 80 [HTTP]. In the dynamic service, the type of traffic that needs to be redirected to a CE must be described to the router. The service can also have an additional attribute that describes whether the service is "open" or "closed". In the "open" service, traffic is forwarded normally (without redirection) if there is no CE to redirect the traffic to. In a "closed" service, traffic is dropped if there is no CE to redirect the traffic.

Thus, in an open service, if the packet is permitted, and/or there is no redirect list, device 112 determines if the mask table specifies a target CE for the packet (e.g., CE 110) (step 326). If so, the packet is redirected to the target CE (step 328). If the mask table does not specify a target CE, the packet is forwarded to internet 122 (step 332).

However, in some embodiments, device 112 defines the service as a "closed" mode, in which the packet does not get redirected to CE 110 because, despite all other factors being met, there is no target CE for this traffic. In this case, device 112 determines if the service is defined as being in a "closed" mode (step 330), and, if it does, the packet is dropped (step 332). This is different from the "open" mode service described above where the device 112 itself forwards the traffic to internet 122. "Closed" modes are useful for traffic that always need to go via CE 110.

Without the rejected traffic management described above, packets redirected to CE 110 that then get rejected by CE 110 is then forwarded as it would be normally (e.g., step 334), and the TCAM entries for the rejected packets would needlessly continue to occupy space on device 112. However, after device 112 receives a suspend command, a WCCP component on device 112 updates the TCAM entries (or modifies ACL rules) corresponding to that flow. Thus, the packet may not match the IP protocol in the service description (step 314) and/or the packet will no longer match a defined port (step 318), which is then forwarded to internet 122 (bypassing the rest of the method).

Thus, with the TCAM entries for the rejected flow removed and the algorithm simplified, TCAM resources and searches, power, etc. are simplified. A simplified algorithm on device 112 means that there is less need to check, modify, and/or modify the steps for error and, hence, there is less processing and faster forwarding of the packets from device 112 compared to the previous flow.

Figure 4:
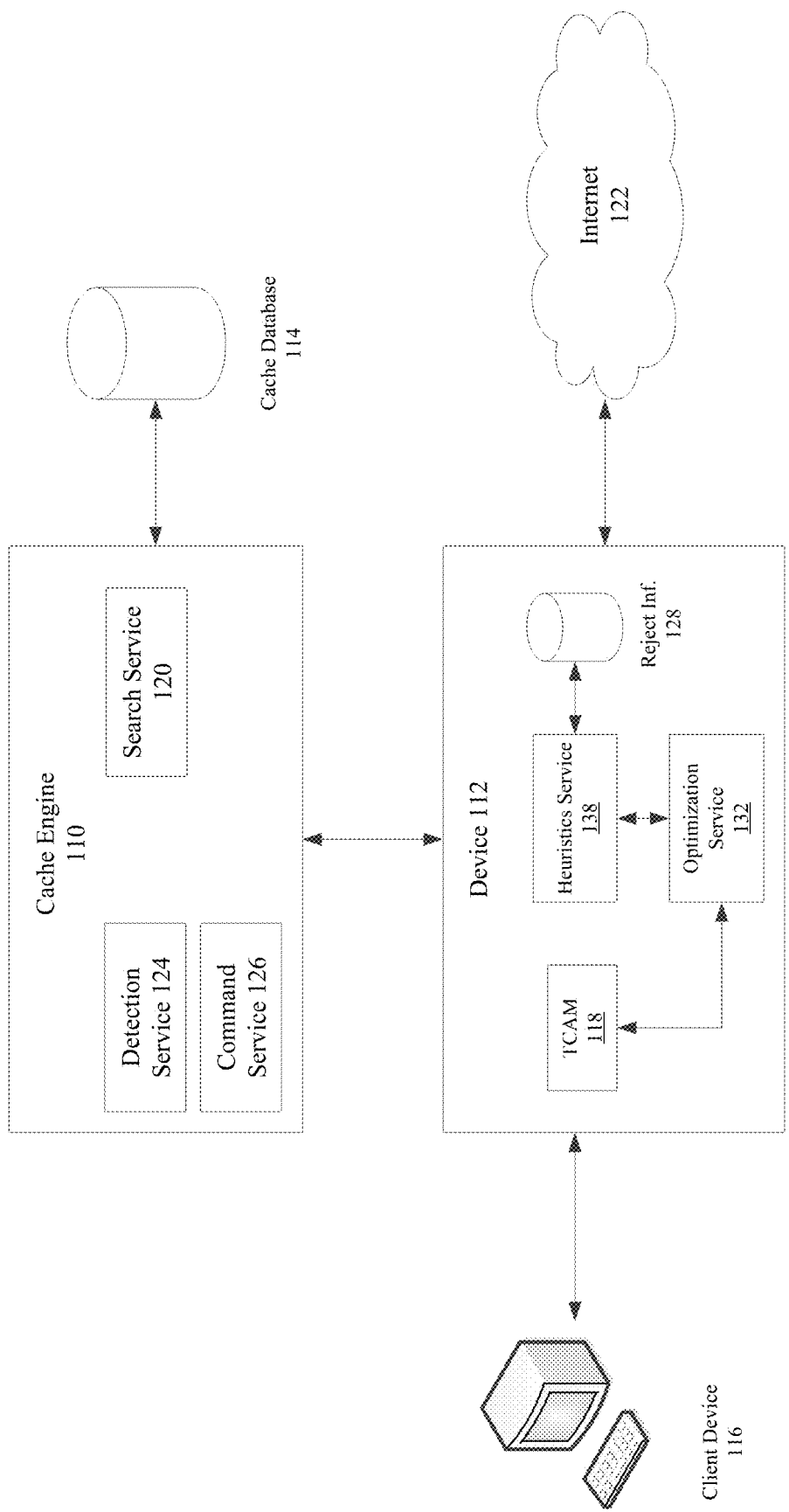
FIG. 4 illustrates an example embodiment of a router/switch based approach to handling rejected WCCP traffic.
Figure 5:
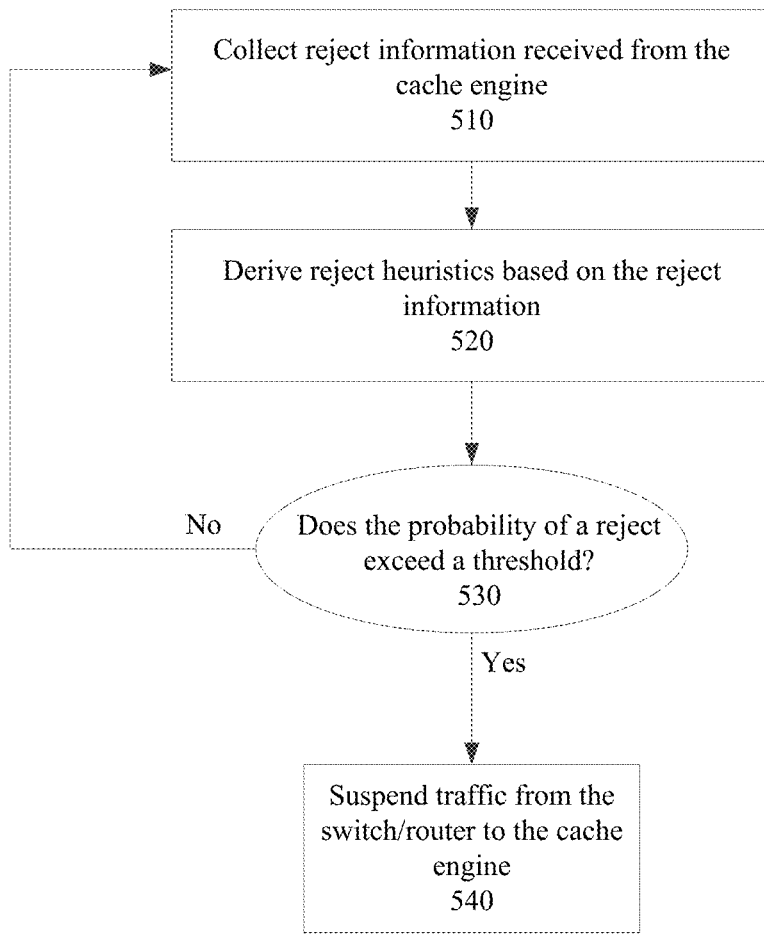
FIG. 5 is a flow chart illustrating an example embodiment of traffic flow in a router/switch based approach to handling rejected WCCP traffic.

FIG. 4 illustrates an example embodiment of a router/switch based approach to handling rejected WCCP traffic. A router/switch self-driven solution is based on packet reject heuristics collected at the router/switch. The router/switch driven solution is also effective at handling packets rejected by CE 110, which optimizes router/switch (e.g., device 112) and CE 110 resources like power, processing, timing, and hardware (e.g., TCAM 118). In the router/switch based approach, an embodiment of which is illustrated in FIG. 5 which is a flow chart illustrating an example embodiment of traffic flow in the router/switch based approach to handling rejected WCCP traffic, device 112 collects reject information from CE 110 (step 510), which includes reject information associated with particular types of traffic from client device 116 to CE 110. Device 112 derives reject heuristics based on the reject information (step 520) and, based on the reject heuristics, suspends the particular types of traffic from being directed to CE 110 (step 540). In some embodiments, traffic is suspended once the probability of a rejection, which is determined by the reject heuristics, exceeds a threshold (step 530).

Device 112 can start collecting packet reject heuristics once WCCP is enabled. The ability of device 112 to collect (or stop collecting) heuristics can be configured and/or updated dynamically. The reject information is collected from counts of rejected packets at an interface of CE 110, where the counts are derived from packets with a source IP of client device 116 and a destination IP of a server the client device 116 originally tried contacting. This information indicates that the traffic was forwarded to internet 122 instead of being redirected to CE 110 (e.g., an indication that the webpage content did not come from cache database 114). In some embodiments, device 112 learns the count of rejected packet from each CE interface via specific ACL rules configured to detect the rejected traffic from the CE. The reject counts can be stored at reject information store 128.

Once the reject packet count hits a threshold, heuristics service 130 can inform a WCCP engine on device 112 (such as an engine within optimization service 132) that it is experiencing rejects from CE 110 and, additionally, details about the flow being rejected. In some embodiments, optimization service 132 and/or WCCP engine can expose an interface or message that allows a client to trigger a temporary suspension of redirection. It can also provide details of the flow being rejected in the interface/message.

In some embodiments, based on the flow and reject information, optimization service 132 identifies the mask/rules that corresponds to the reject traffic as well as the CE corresponding to the rejected traffic. Optimization service 132 then configures a new ACL and/or updates or removes an existing mask or rule for this traffic so that the redirection never happens for such traffic subsequently. In some embodiments, new rules are applied that overrides the previous rules.

The time over which redirection is suspended depends on the two approaches discussed above with respect to the CE based approach: command based (e.g., CE 110 drives the resume through a command sent to device 112 after CE 110 and device 112 agree on a protocol) and time based (device 112 internally starts a timer and upon its expiry, device 112 reapplies the previous rules to resume redirection for the suspended flow). Once the resume condition is met, device 112 will remove the temporary suspension and flow will be redirected towards CE 110 as before (e.g., optimization service 132 reapplies previous rules and/or entries in TCAM 118).

The benefits of the router/switch based approach include reducing traffic flows towards the CE; improving timing and power; optimizing hardware resource usage (by removing flow entries from TCAM 118 that resulted in rejected packets); reducing unnecessary hops due to unnecessary redirection, encapsulation/decapsulation at both the router/switch and the CE; and, based on the resource optimization, can allow other features to utilize the newly freed resources at the router/switch and CE.

Figure 6:
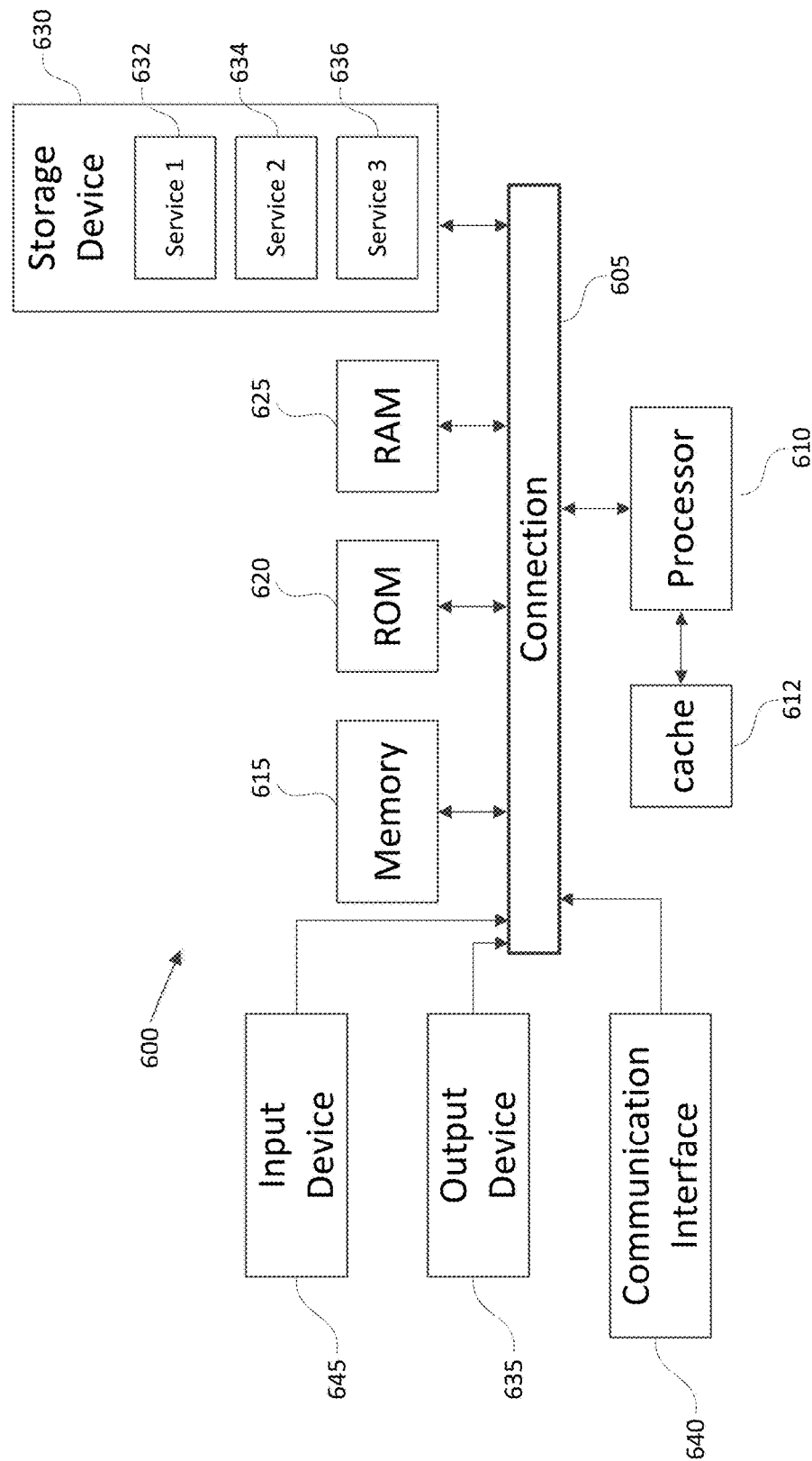
FIG. 6 shows an example of a system for implementing certain aspects of the present technology.

FIG. 6 shows an example of computing system 600 that can be used in combination with the embodiments discussed above. For example, computing system 600 can represent any of FIG. 1 or 4, or a combination of such devices. In computing system 600 the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for management of traffic in a Web Cache Communication protocol (WCCP), the system comprising:
a switch receiving traffic from a client device; and
a cache engine in communication with the switch, the cache engine configured to:
receive a request from the switch to direct the traffic from the client device to the cache engine;
determine the traffic from the client device is rejected WCCP traffic from the client device;
determine the cache engine cannot process the rejected WCCP traffic from the client device; and
in response to determining the cache engine cannot process the rejected WCCP traffic from the client device, send a command to the switch to suspend routing of at least a portion of the traffic to the cache engine, the command including instructions to remove a rule regarding the routing to the cache engine and/or modify an access control list rule to exclude the cache engine.

2. The system of claim 1, wherein the cache engine is configured to send a resume command to the switch to resume traffic to the cache engine after a period of time has elapsed.

3. The system of claim 1, wherein the command specifies a period of time to suspend the routing to the cache engine to cause the switch to resume the routing to the cache engine when the period of time has elapsed.

4. The system of claim 1, wherein the determining that the cache engine cannot process the rejected WCCP traffic from the client device is based in part on the cache engine being overloaded with requests from other switches or routers.

5. The system of claim 1, wherein the determining that the cache engine cannot process the rejected WCCP traffic from the client device is based in part on requests from other switches or routers having higher priority traffic requirements than the rejected WCCP traffic from the client device.

6. The system of claim 1, wherein the determining that the cache engine cannot process the rejected WCCP traffic from the client device is based in part on the cache engine being in a maintenance mode for a period of time.

7. The system of claim 1, wherein suspension of the routing to the cache engine is infinite when the cache engine determines the rejected WCCP traffic is associated with live content.

8. The system of claim 1, wherein the routing to the cache engine is resumed by re-applying the rule regarding the routing to the cache engine.

9. The system of claim 1, further comprising:
collecting, via the switch, reject information associated with types of the traffic from the client device to the cache engine;
deriving reject heuristics based on the reject information; and
based on the reject heuristics, suspending only a portion of the types of the traffic from being directed to the cache engine.

10. The system of claim 9, wherein the reject information is collected from counts of rejected packets at an interface of the cache engine, the counts being from packets where source IP is that of the client device and destination IP is that of a server the client device originally tried contacting.

11. A method for management of traffic in a Web Cache Communication protocol (WCCP), the method comprising:
receiving a request from a switch to direct traffic from a client device to a cache engine, the cache engine being in communication with the switch;
determining the traffic from the client device is rejected WCCP traffic from the client device;
determining the cache engine cannot process the rejected WCCP traffic from the client device; and
in response to the determining that the cache engine cannot process the rejected WCCP traffic from the client device, sending a command to the switch to suspend routing of at least a portion of at least a portion of the traffic to the cache engine, the command including instructions to remove a rule regarding the routing to the cache engine and/or modify an access control list rule to exclude the cache engine.

12. The method of claim 11, wherein the determining that the cache engine cannot process the rejected WCCP traffic from the client device includes the cache engine locally detecting temporary glitches in processing switch requests.

13. The method of claim 11, wherein the determining that the cache engine cannot process the rejected WCCP traffic from the client device includes:
   detecting, via the cache engine, a choke or reject for traffic from the client device; and
   communicating a status associated with the choke or reject to the switch.

14. The method of claim 11, wherein the determining that the cache engine cannot process the rejected WCCP traffic from the client device includes:
   detecting, via the cache engine, a choke or reject for all traffic from other devices; and
   communicating a status associated with the choke or reject to the switch.

15. The method of claim 11, wherein the command to suspend the at least the portion of the traffic to the cache engine is a new extension to the WCCP.

16. The method of claim 11, wherein the command to suspend the at least the portion of the traffic to the cache engine is limited to suspension of the rejected WCCP traffic from the client device.

17. A non-transitory computer readable storage medium having a plurality of instructions stored thereon, which when executed by a processor, cause the processor to perform operations comprising:
   receiving a request from a switch to direct traffic from a client device to a cache engine, the cache engine being in communication with the switch;
   determining the traffic from the client device is rejected Web Cache Communication protocol (WCCP) traffic from the client device;
   determining the cache engine cannot process the rejected WCCP traffic from the client device; and
   in response to the determining that the cache engine cannot process the rejected WCCP traffic from the client device, sending a command to the switch to suspend routing of at least a portion of at least a portion of the traffic to the cache engine, the command including instructions to remove a rule regarding the routing to the cache engine and/or modify an access control list rule to exclude the cache engine.

18. The non-transitory computer readable storage medium of claim 17, wherein the operations include sending a resume command to the switch to resume traffic to the cache engine after a period of time has elapsed.

19. The non-transitory computer readable storage medium of claim 17, wherein the command specifies a period of time to suspend the at least the portion of the traffic, and the switch resumes the routing to the cache engine when the period of time has elapsed.

20. The non-transitory computer readable storage medium of claim 17, wherein suspension of the traffic to the cache engine is infinite when the cache engine determines the rejected WCCP traffic is associated with live content.

\* \* \* \* \*